United States Patent
Bleys et al.

(10) Patent No.: US 6,291,587 B1
(45) Date of Patent: *Sep. 18, 2001

(54) ELASTOMERS FROM COMPOSITIONS COMPRISING RIGID THERMOPLASTIC POLYURETHANE

(75) Inventors: Gerhard Jozef Bleys; Dominicus Limerkens, both of Belgium (BE)

(73) Assignee: Imperial Chemical Industries PLC, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,749

(22) Filed: Feb. 8, 1999

(30) Foreign Application Priority Data

Feb. 9, 1998 (EP) ................................. 98102213

(51) Int. Cl.⁷ ............... C08L 9/00; C08L 21/00; C08L 75/04
(52) U.S. Cl. .................. 525/131; 525/66; 525/92 C; 525/458
(58) Field of Search ................... 525/126, 131, 525/92 C, 458, 66

(56) References Cited

U.S. PATENT DOCUMENTS

| | | | | |
|---|---|---|---|---|
| 4,342,847 | * | 8/1982 | Goyent | 525/66 |
| 4,376,834 | * | 3/1983 | Goldwasser | 521/159 |
| 4,567,236 | * | 1/1986 | Goldwasser | 525/172 |
| 5,376,723 | * | 12/1994 | Vogt | 525/126 |
| 5,491,194 | | 2/1996 | Henton et al. | |
| 5,785,916 | | 7/1998 | Huarng | |

FOREIGN PATENT DOCUMENTS

| | | |
|---|---|---|
| 4126499 | 2/1993 | (DE) . |
| 0500259 | 2/1992 | (EP) . |

* cited by examiner

Primary Examiner—Patricia A. Short
(74) Attorney, Agent, or Firm—Pillsbury Winthrop LLP

(57) ABSTRACT

Compositions comprising (A) a rigid thermoplastic polyurethane not having a major glass transition temperature ($T_g$) of less than 60° C. and (B) a rubber-like material having a $T_g$ of less than 20° C., wherein the weight ratio (A):(B) is at most 85:15.

21 Claims, No Drawings

ELASTOMERS FROM COMPOSITIONS COMPRISING RIGID THERMOPLASTIC POLYURETHANE

DESCRIPTION

1. Field of Invention

The present invention relates to elastomers and preferably thermoplastic elastomers (TPE's) and more specifically to thermoplastic elastomers produced from compositions comprising rubber-like materials and rigid thermoplastic polyurethane, wherein the rubber-like material phase is optionally vulcanised or optionally dynamically vulcanised.

2. Description of the Prior Art

Thermoplastic elastomers are a class of materials which combine properties of vulcanised rubber with the processing properties of conventional thermoplastics. Examples of these materials are well known in the art. Usually they consist of block copolymers, which exhibit a multiphase microstructure. Best known examples are styrene-elastomer block copolymers like styrene-butadiene-styrene (SBS) or styrene-isoprene-styrene (SIS). Other examples are polyamide-elastomer and polyurethane-elastomer multiblock copolymers. For more examples see e.g. chapter 13 of "Science and Technology of Rubber", 2nd ed., J. E. Mark et al. eds., Academic Press, 1994.

Thermoplastic elastomers can also be produced by blending hard thermoplastic material with a rubber-like material. Examples are natural rubber-polypropylene (NR-PP) blends (TPNR's) and EPDM-PP blends, often referred to as thermoplastic olefins (TPO's). Many examples are given in "Thermoplastic Elastomers from Rubber-Plastic Blends", DE and BHOWMICK eds., Ellis Horwood, 1990.

It is also known in the art that the properties of thermoplastic elastomers, based on rubber-plastic blends, can sometimes be improved by crosslinking or vulcanising the rubber phase during the mixing process. This process is called dynamic vulcanisation and results in a material usually referred to as a thermoplastic vulcanizate (TPV) or an elastomeric alloy (EA). TPVs have been thoroughly studied by Coran and co-workers (e.g. Rubber Chem. Technol. 53, p781 (1980), Rubber Chem. Technol. 63, p.599 (1989), Rubber Chem. Technol. 68, p351 (1995)).

Most commonly TPV's are based on ethylene propylene diene monomer rubber/polypropylene (EPDM/PP) dynamically vulcanized blends (see e.g. U.S. Pat. No. 3,758,643, U.S. Pat. No. 3,806,558).

Thermoplastic polyurethanes or TPU's are thermoplastic elastomers consisting of soft segments and hard segments commonly produced from the reaction between macroglycols, diisocyanates and short chain diols. They exhibit elastomeric as well as thermoplastic properties and show two major glass transition temperatures $T_g^h$ and $T_g^s$, corresponding to respectively the hard and the soft phases.

The term 'glass transition temperature' or $T_g$ as used herein is well understood by people skilled in the art and the concept is explained fully in chapter 2 of "Mechanical Properties of Polymers", L. E. Nielsen, Chapman & Hall, London, 1962, and can be easily established by well known methods like 'differential scanning calorimetry' (DSC).

Usually the $T_g^s$ is lower than about –10° C. and the $T_g^h$ higher than 50° C. Blends of TPU's with other thermoplastics are well known in the art. E.g. blends of TPU with polyoxymethylene (POM), polyvinylchloride (PVC), styrene acrylonitrile (SAN) and acrylonitrile butadiene styrene (ABS) are of commercial importance.

Another type of thermoplastic polyurethane exists called rigid TPU or rTPU, which contains no or only small amounts of soft segments. These products show thermoplastic behaviour but no elastomeric behaviour and are glassy or (semi-)crystalline at ambient temperature. They usually exhibit no major glass transition temperature ($T_g$) below room temperature.

U.S. Pat. No. 4,376,834 to Goldwasser et al. teaches high impact resistant rigid TPU based on an organic polyisocyanate, a chain extender and from about 2 to about 25% of an isocyanate-reactive material with a functionality of >1.9 and a molecular weight of about 500 to 20000 (soft segment). It is suggested that the material has a two-phase morphology and that the lowest $T_g$ occurs below room temperature, while the $T_g$ of the urethane glass phase occurs at approximately 100° C.

However, U.S. Pat. No. 4,567,236 (to Goldwasser) teaches virtually the same rigid TPU which has only one $T_g$ which is claimed to be >50° C. The rigid TPU in U.S. Pat. No. 4,567,236 is blended with materials known in the art as impact modifiers like ABS, ethylene vinyl acetate (EVA), chlorinated polyethylene (cPE), methylmethacrylate-butadiene-styrene and the like. The amount of impact modifier is said to range between 3 and 25% by weight. In the examples the amount of impact modifier used is 15 parts by weight on 85 parts by weight of rTPU.

U.S. Pat. No. 4,822,827 (to Beck et al.) teaches an improvement over the prior art rTPU's by replacing part of the chain extender composition with a cycloalkanediol. The novel rTPU's are characterised by a $T_g$>125° C.

U.S. Pat. No. 5,167,899 (to Jezic) teaches the production of microfibers from rigid TPU's. An example is given of microfibers from a commercial rTPU ('ISOPLAST' 301, 'ISOPLAST' is a Trademark of DOW Chemical Co.) which composition matches this described in U.S. Pat. No. 4,822,827.

WO-A 93/02238 (to Moses et al.) teaches blends of PET and rTPU. The amount of polyol in the rTPU is limited in such a way that the $T_g$ remains >60° C. The rTPU used in the examples is again 'ISOPLAST' 301, however the $T_g$ is said to be 114° C.

U.S. Pat. No. 5,574,092 (to Oriani) teaches rTPU with lower melt processing temperature, by incorporating aromatic diols in the chain extender composition. The $T_g$ is claimed to be >50° C.

U.S. Pat. No. 5,376,723 (to Vogt et al.) discloses thermoplastic polymer blends having a Shore A hardness of about 55 to 70 comprising, in a volume percentage ratio of about 30:70 to 40:60, a PU component containing at least about 50 wt % polyisocyanate and a nitrile rubber component containing about 34 mol % acrylonitrile.

Although numerous types of thermoplastic elastomers are known, there is still a need for improved thermoplastic materials having elastomeric properties.

SUMMARY OF THE INVENTION

It has now surprisingly been found that elastomers and preferably thermoplastic elastomers with useful properties can be produced by melt blending rigid TPU not having a major $T_g$ of less than 60° C. and a rubber-like material having a $T_g$ of less than 20° C., the weight ratio of the rigid TPU and the rubber-like material being at most 85:15.

The elastomers of the invention combine some of the advantages of the conventional TPU elastomers and of the rubber-like materials used. Because of the large number of possible combinations a wide range of materials can be produced with a wide range of properties.

DETAILED DESCRIPTION OF THE INVENTION

The invention thus relates to a composition comprising (A) a rigid thermoplastic polyurethane not having a major $T_g$ of less than 60° C. and (B) a rubber-like material having a $T_g$ of less than 20° C., wherein the weight ratio (A):(B) is at most 85:15.

The rigid thermoplastic polyurethane (rTPU) of the present invention is obtainable by reaction of diisocyanate(s) with chain extender(s) and optionally macroglycol(s) at an isocyanate index of 95 to 105, pref. 98 to 102.

Suitable thermoplastic polyurethanes may also be obtained by blending different polyurethanes in such amounts that the blend does not have a major $T_g$ of less than 60° C.

The term "isocyanate index" as used herein is the ratio of isocyanate-groups over isocyanate-reactive hydrogen atoms present in a formulation, given as a percentage. In other words, the isocyanate index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymer forming process involving the isocyanate ingredient and the isocyanate-reactive ingredients. Any isocyanate groups consumed in a preliminary step to produce modified polyisocyanates (including such isocyanate-derivatives referred to in the art as quasi- or semi-prepolymers) or any active hydrogens reacted with isocyanate to produce modified polyols or polyamines, are not taken into account in the calculation of the isocyanate index. Only the free isocyanate groups and the free isocyanate-reactive hydrogens present at the actual elastomer forming stage are taken into account.

The rTPU can be produced in the so-called one-shot, semi-prepolymer or prepolymer method, by casting, extrusion or any other process known to the person skilled in the art.

The macroglycol optionally used has a molecular weight of between 500 and 20000 and is used in an amount of 0 to 50% by weight, preferably less than 25% by weight, more preferably less than 10% by weight and most preferably less than 5% by weight, based on the total weight of the thermoplastic polyurethane. The macrodiol is always present in such an amount and composition that the rTPU does not have a major glass transition temperature below 60° C.

The amount of macroglycols as a percentage of the total composition of the rigid TPU is defined as the softblock content of the rTPU.

The macroglycols may be selected from polyesteramides, polythioethers, polycarbonates, polyacetals, polyolefins, polysiloxanes and, especially, polyesters and polyethers.

Polyether glycols which may be used include products obtained by the polymerisation of a cyclic oxide, for example ethylene oxide, propylene oxide, butylene oxide or tetrahydrofuran in the presence, where necessary, of difunctional initiators. Suitable initiator compounds contain 2 active hydrogen atoms and include water, butanediol, ethylene glycol, propylene glycol, diethylene glycol, triethylene glycol and dipropylene glycol. Mixtures of initiators and/or cyclic oxides may be used.

Especially useful polyether glycols include polyoxypropylene glycols and poly(oxyethylene-oxypropylene) glycols obtained by the simultaneous or sequential addition of ethylene or propylene oxides to difunctional initiators as fully described in the prior art. Random copolymers having oxyethylene contents of 10–80%, block copolymers having oxyethylene contents of up to 25% and random/block copolymers having oxyethylene contents of up to 50%, based on the total weight of oxyalkylene units, may be mentioned, in particular those having at least part of the oxyethylene groups at the end of the polymer chain. Other useful polyether glycols include polytetramethylene glycols obtained by the polymerisation of tetrahydrofuran.

Polyester glycols which may be used include hydroxyl-terminated reaction products of dihydric alcohols such as ethylene glycol, propylene glycol, diethylene glycol, 1,4-butanediol, neopentyl glycol or 1,6-hexanediol, or mixtures of such dihydric alcohols, and dicarboxylic acids and their ester-forming derivatives, for example succinic, glutaric and adipic acids or their dimethyl esters, sebacic acid, phthalic anhydride, tetrachlorophthalic anhydride or dimethyl terephthalate or mixtures thereof.

Polythioether glycols which may be used include products obtained by condensing thiodiglycol either alone or with other glycols, alkylene oxides or dicarboxylic acids.

Polycarbonate glycols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal glycols which may be used include those prepared by reacting glycols such as diethylene glycol, triethylene glycol or hexanediol with formaldehyde. Suitable polyacetals may also be prepared by polymerising cyclic acetals.

Suitable polyolefin glycols include hydroxy-terminated butadiene homo- and copolymers and suitable polysiloxane glycols include polydimethylsiloxane diols.

Chain extenders can be any difunctional isocyanatereactive species with a molecular weight of less than 500, preferably a diol, more preferably a branched diol or blends of different types.

Suitable chain extenders include aliphatic diols, such as ethylene glycol, 1,3-propanediol, 1,4-butanediol, 1,6-hexanediol, 1,2-propanediol, 1,3-butanediol, 2,3-butanediol, 1,3-pentanediol, 1,2-hexanediol, 3-methyl-1,5-pentanediol, diethylene glycol, dipropylene glycol and tripropylene glycol. Chain extenders with an odd-number of carbon atoms between the hydroxyl groups, and chain extenders with a branched chain stucture like 2-methyl-1,3-propanediol, 2,2-dimethyl-2,3-propanediol, 1,3-propanediol, 1,5-pentanediol are preferred. Cycloaliphatic diols like 1,4-cyclohexanediol, 1,2-cyclohexanediol, 1,4-cyclohexanedimethanol or 1,2-cyclohexanedimethanol, and aromatic diols like hydroquinone bis(hydroxyethylether) and the like can also be used.

Preferred chain extenders are neopentylglycol, 1,3-propanediol, 2-methyl-1,3-propanediol and other diols having a molecular weight of less than 500 containing an alkylene group with an odd number of carbon atoms between the two hydroxyl groups.

Organic polyisocyanates may be selected from aliphatic, cycloaliphatic and aralphatic polyisocyanates, especially diisocyanates, like hexamethylene diisocyanate, isophorone diisocyanate, cyclohexane-1,4-diisocyanate, 4,4'-dicyclohexylmethane diisocyanate and m- and p-tetramethylxylylene diisocyanate, and in particular aromatic polyisocyanates like tolylene diisocyanates (TDI), phenylene diisocyanates and most preferably diphenylmethane diisocyanates (MDI), particularly MDI comprising 4,4'-diphenylmethane diisocyanate.

The diphenylmethane diisocyanates may consist essentially of pure 4,4'-diphenylmethane diisocyanate or mixtures of that diisocyanate with one or more other organic polyisocyanates, especially other diphenylmethane diisocyanate isomers, for example the 2,4'-isomer optionally in conjunction with the 2,2'-isomer. The polyisocyanate component may also be an MDI-variant derived from a polyisocyanate composition containing at least 85% by weight of 4,4'-diphenylmethane diisocyanate. MDI variants are well known in the art and, for use in accordance with the invention, perticularly include liquid products obtained by introducing carbodiimide groups into said polyisocyanate composition and/or by reacting with one or more polyols.

Preferred are polyisocyanate compositions containing at least 90% by weight of 4,4'-diphenylmethane diisocyanate. Polyisocyanate compositions containing at least 95% by weight of 4,4'-diphenylmethane diisocyanate are most preferred.

The rubber-like material used in the invention can be any conventional rubber known in the art having a $T_g$ of less than 20° C.: non polar rubbers like butadiene rubber (BR), styrene butadiene rubber (SBR), isoprene rubber (IR), natural rubber (NR), butyl rubber (IIR), ethylene propylene rubber (EPR), ethylene propylene diene monomer rubber (EPDM) and polar rubbers like nitrile rubber (NBR), carboxylated nitrile rubber (XNBR), acrylate rubber (ACM), chloroprene rubber (CR), ethylene acrylate rubber (EAM), nitrile-isoprene rubber (NIR), epichlorohydrin rubber (ECO) or halobutyl rubber.

The rubber-like material used in the invention may also be thermoplastic elastomers (TPE's) like SBS, SIS, SEBS, TPU and the like, thermoplastic vulcanizates (TPV's) like ethylene propylene diene monomer rubber/polypropylene (EPDM/PP) dynamically vulcanized blends, plastomers like ethylene vinylacetate (EVA) copolymers or very low density polyethylene (VLDPE), or any thermoplastic elastomer derived from blends of plastics and rubbers.

A preferred rubber-like material is any material other than a polyurethane. More preferred are diene rubbers, hydrogenated diene rubbers, rubbers based on ethylene propylene blends, nitrile rubbers or copolymers like EPR and EPDM rubbers.

Preferably the rubber-like material has a $T_g$ below 0° C., more preferably below −20° C.

The weight ratio rigid TPU:rubber-like material in the compositions of the present invention is at most 85:15, preferably at most 75:25 and more preferably at most 50:50.

In another embodiment of the invention properties of the compositions of the invention may be improved through the use of compatibilizing agents. In many cases the properties of blends and of TPV's can be improved through the use of compatibilizing additives, also called compatibilizers. Compounds of this kind are well known in the art and often are block copolymers or graft copolymers where the blocks consist of the same polymers which have to be compatibilized. The compatibilizers can be produced seperately and added before or after blending, or can be produced in-situ during blending. The latter process is referred to as reactive compatibilization. An overview of polymer compatibilization and examples of compatibilizers for different polymer pairs are given in "Polymer Blends and Alloys", Folkes and Hope Eds., Chapman & Hall, (1993).

Compatibilizers useful in the invention can be non-reactive copolymers or non-reactive graft copolymers consisting of e.g. polyurethane-rubber graft copolymer, or a block copolymer where one block is compatible with the rTPU phase and the other block with the rubber-like material phase. The use of reactive compatibilizers, e.g. where all or part of the PU phase is modified to become reactive with the rubber-like material phase, or all or part of the rubber-like material phase is modified to become reactive with the PU phase, or both, can also be contemplated.

In another, preferred, embodiment of the invention, the rubber-like material phase is vulcanized, preferably dynamically vulcanized, i.e. vulcanized during the blending process. Vulcanization of the rubber-like material phase can be achieved with compositions known to people skilled in the art. Sulphur systems, accelerated sulfur systems, peroxides, phenolics and the like are preferred vulcanizing systems. An overview of the most commonly used vulcanization systems can be found in "Science and Technology of Rubber", 2nd. Ed. academic press, 1994.

The rubber-like material phase may also be vulcanized in a conventional (i.e. non-dynamic) way, e.g. in a press mould. The polymer composition must therefore be compounded with vulcanizing agents after which the material is compression moulded at higher temperatures to get formed and vulcanized.

Melt blending and dynamic vulcanization can be achieved using conventional internal or external mixers well known in the art. Alternatively, blending can be achieved using e.g. a twin screw extruder, or a compounding single screw extruder. An overview of the practical aspects of polymer blending can be found in "Polymer Blends and Alloys", Folkes and Hope eds, Chapman & Hall, (1993).

Auxiliaries and additives typical for both polyurethanes and rubber technologies may be used as well. Additives and auxiliaries can be added to either or both of the TPU and the rubber-like material phase before, during or after blending and/or vulcanization. Such auxiliaries and additives include catalysts, for example tertiary amines and tin compounds, surface-active agents, for example siloxane-oxyalkylene copolymers, extender oils, flame retardants, plasticizers, organic and inorganic fillers, pigments, anti-oxidants, UV stabilizers, physical or chemical blowing agents, antireversion agents and internal mould release agents.

The invention also relates to a process for preparing elastomers by melt-blending a rigid thermoplastic polyurethane which does not exhibit a major $T_g$ below 60° C., with a rubber-like material having a $T_g$ of less than 20° C., the weight ratio of the rigid thermoplastic polyurethane and the rubber-like material being at most 85:15, and to elastomers, preferably thermoplastic elastomers, thus obtained.

The compounds (A) and (B) may be stored or handled separately, but the compositions of the present invention are preferably in the form of a blend comprising (A) and (B), either liquid or solid. A particularly preferred form for the composition is a granular solid.

Furthermore, the invention concerns the use of compositions as herein described for making elastomers wherein (A) and (B) are mixed prior to or during the elastomer production.

Advantage, Use.

The elastomers of the invention combine some of the advantages of conventional TPU elastomers and of the rubber-like materials used. Because of the large number of possible combinations a wide range of materials can be produced with a wide range of properties.

The resulting elastomers can be used in a number of applications such as shoesoles, shoe-insoles, automotive parts (dashboards, window seals, bumperholders) or other applications like watch straps, tool grips or cable insulation.

EXAMPLES

Example 1

4,4'-MDI was mixed with 2-methyl-1,3-propanediol at an isocyanate index of 101, using a Heydolph bench mixer at 3000 rpm. Both chemicals were initially at a temperature of 50° C. and the total amount of the composition was 250 g. Mixing time was 2 minutes. The reacting mixture was then poured in an open aluminium mould, placed on a thermostatted hot plate, set at 120° C. The mould had first been treated with a proper release agent. The amount poured was such that the thickness of the cast remained <5 mm. After 1 hour the cast was taken from the mould and put in an oven at 100° C. for 24 hours. After cooling the cast was shredded.

The $T_g$ of the resulting rigid TPU was measured by DSC to be 115° C. The DSC equipment used was a METTLER type TA4000 equipped with a DSC30 measuring cell at a heating rate 30° C./minute.

100 g of the above shredded rigid TPU was dry-blended with 150 g nitrile rubber (NYSYN 30-5, a nitrile rubber (NBR) containing 30% acrylonitrile; 'NYSYN' is a trademark of DSM). The $T_g$ of this rubber was measured by DSC to be about −25° C.

The dry mixture was melt-blended in a HAAKE RHEO-MIX 3000 internal mixer. The mixing rate was set at 80 rpm and the temperature setting was 185° C. After complete melting of the blend, mixing continued for 3 minutes, after which the mixture was discharged cooled, and shredded.

The shredded blend was extruded using a HAAKE RHEOMEX R254, L/D 25, single screw extruder, equipped with a conventional PE screw with a compression ratio of 1:3, and a 3 mm rod die. Properties were measured on the extruded rods using an Instron 4500, operating with a cross-head speed of 100 mm/min. The resulting material showed a stress at break of 1.3 MPa and and elongation at break of 90%. The shore A hardness was about 70.

Example 2

100 g of the shredded TPU of example 1 was dry-blended with 150 g nitrile rubber of example 1. The dry mixture was melt-blended in a HAAKE RHEOMIX 3000 internal mixer. The mixing rate was set at 80 rpm and the temperature setting was 185° C. After complete melting of the mixture 4.5 g of bis-(hydroxymethyl)-p-cresol, 7.5 g of ZnO and 1.5 g of stearic acid were added. Mixing was then continued for 2 min at 80 rpm, then the mixing speed was reduced to 50 rpm for 13 minutes, after which the vulcanizate was discharged, cooled and shredded.

The shredded vulcanizate was extruded using a HAAKE RHEOMEX R254, L/D 25, single screw extruder, equipped with a conventional PE screw with a compression ratio of 1:3, and a 3 mm rod die. The temperature settings were: ZONE 1: 185° C.; ZONE 2: 205° C.; ZONE 3: 215° C.; DIE: 225° C. properties were measured on the extruded rods using an Instron 4500, operating with a cross-head speed of 100 mm/min. The resulting stress at break of the material was 17 MPa with an elongation at break of 45% and a Shore A hardness of about 90.

Example 3

100 g of ISOPLAST 101 pellets were dry-blended with 150 g nitrile rubber of example 1. ISOPLAST 101 is a commercially available rigid TPU from DOW Chemicals, 'ISOPLAST' is a trademark of DOW Chemical Co. The $T_g$ of this material, as measured according to the DSC method described above is about 95° C. The material does not show any major transitions below this temperature.

The dry mixture was melt-blended in a HAAKE RHEO-MIX 3000 internal mixer. The mixing rate was set at 80 rpm and the temperature setting was 185° C. After complete melting of the mixture 6 grams of dicumylperoxide (DCP) was added. Mixing was then continued for 2 min at 80 rpm, then the mixing speed was reduced to 50 rpm for 13 minutes, after which the vulcanizate was discharged, cooled and shredded.

The shredded vulcanizate was extruded using a HAAKE RHEOMEX R254, L/D 25, single screw extruder, equipped with a conventional PE screw with a compression ratio of 1:3, and a 3 mm rod die. Properties of the material were measured on the extruded rods using an Instron 4500, operating with a cross-head speed of 100 mm/min. The resulting stress at break of the material was 5.2 MPa with an elongation at break of 50% and a Shore A hardness of about 90.

Example 4

100 g of the shredded rigid TPU of example 1 was dry-blended with 150 g EPDM rubber. (KELTAN 4903, 'KELTAN' is a trademark of DSM). The $T_g$ of this rubber was measured by DSC to be about −45° C.

The dry mixture was melt-blended in a HAAKE RHEO-MIX 3000 internal mixer. The mixing rate was set at 80 rpm and the temperature setting was 185° C. After complete melting of the mixture 7.5 grams of dicumylperoxide (DCP) was added. Mixing was then continued for 2 min at 80 rpm, then the mixing speed was reduced to 50 rpm for 13 minutes, after which the vulcanizate was discharged, cooled and shredded.

The shredded vulcanizate was extruded using a HAAKE RHEOMEX R254, L/D 25, single screw extruder, equipped with a conventional PE screw with a compression ratio of 1:3, and a 3 mm rod die. Properties of the material were measured on the extruded rods using an Instron 4500, operating with a cross-head speed of 100 mm/min. The resulting stress at break of the material was 6.6 MPa with an elongation at break of 10% and a Shore A hardness of about 93.

What is claimed is:

1. A composition comprising:
   (A) a rigid thermoplastic polyurethane not having a major $T_g$ of less than 60° C.; and
   (B) a rubber-like material selected from the group consisting of rubbers, thermoplastic elastomers, thermoplastic vulcanizates and plastomers;
   wherein said material has a $T_g$ of less than 20° C.; and
   wherein the weight ratio (A):(B) is at most 50:50.

2. Composition according to claim 1 wherein the rubber-like material is a material other than a polyurethane.

3. Composition according to claim 2 wherein the rubber-like material is selected from the group consisting of diene rubbers, hydrogenated diene rubbers, nitrile rubbers, rubbers based on ethylene propylene blends, EPR and EPDM rubbers.

4. Composition according to claim 1 wherein the $T_g$ of the rubber-like material is less than 0° C.

5. Composition according to claim 4 wherein the $T_g$ of the rubber-like material is less than −20° C.

6. Composition according to claim 1 wherein the rigid thermoplastic polyurethane is based on diphenylmethane diisocyanate.

7. Composition according to claim 6 wherein the diphenylmethane diisocyanate comprises 4,4'-diphenylmethane diisocyanate.

8. Composition according to any claim 1 wherein the soft-block content of the thermoplastic polyurethane is less than 25% by weight, based on the total weight of the thermoplastic polyurethane.

9. Composition according to claim 8 wherein the soft-block content of the thermoplastic polyurethane is less than 10% by weight, based on the total weight of the thermoplastic polyurethane.

10. Composition according to claim 7 wherein the soft-block content of the thermoplastic polyurethane is less than 5% by weight, based on the total weight of the thermoplastic polyurethane.

11. Composition according to claim 1 wherein the thermoplastic polyurethane is made using a chain extender selected from the group consisting of neopentylglycol, 1,3-propanediol, 2-methyl-1,3-propanediol and other diols having a molecular weight of less than 500 containing an alkylene group with an odd number of carbon atoms between the two hydroxyl groups.

12. Composition according to claim 1 which comprise s a compatibilizer.

13. Composition according to claim 12 wherein said compatibilizer is a reactive compatibilizer.

14. Composition according to claim 1 wherein the rubber-like material phase is vulcanized.

15. Composition according to claim 14 which is dynamically vulcanized.

16. Composition according to claim 14 wherein the vulcanizing system is selected from the group consisting of sulphur containing systems, phenolic containing systems, peroxide containing systems.

17. Composition as defined in claim 1 which is in the form of a blend, either liquid or solid.

18. Composition according to claim 17 which is a granular solid.

19. A method of preparing an elastomer comprising mixing components (A) and (B) as defined in claim 1 prior to or during the elastomer production.

20. A process for preparing elastomers comprising melt-blending:

(A) a rigid thermoplastic polyurethane not having a major $T_g$ of less than 60° C.; and (B) a rubber-like material selected from the group consisting of rubbers, thermoplastic elastomers, thermoplastic vulcanizates and plastomers;

wherein said material has a $T_g$ of less than 20° C.; and wherein the weight ratio (A):(B) is at most 50:50.

21. Thermoplastic elastomers obtained by the process according to claim 20.

* * * * *